United States Patent
Tokimune et al.

(10) Patent No.: US 9,926,437 B2
(45) Date of Patent: Mar. 27, 2018

(54) RUBBER COMPOSITION FOR TIRES, AND PNEUMATIC TIRE

(71) Applicant: SUMITOMO RUBBER INDUSTRIES, LTD., Kobe-shi, Hyogo (JP)

(72) Inventors: Ryuichi Tokimune, Kobe (JP); Tatsuya Miyazaki, Kobe (JP); Masanobu Nakamura, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 14/894,446

(22) PCT Filed: May 19, 2014

(86) PCT No.: PCT/JP2014/063172
§ 371 (c)(1),
(2) Date: Nov. 27, 2015

(87) PCT Pub. No.: WO2014/203667
PCT Pub. Date: Dec. 24, 2014

(65) Prior Publication Data
US 2016/0122517 A1    May 5, 2016

(30) Foreign Application Priority Data

Jun. 18, 2013  (JP) .................... 2013-127758

(51) Int. Cl.
*C08L 7/00* (2006.01)
*C08L 9/00* (2006.01)
*B60C 1/00* (2006.01)

(52) U.S. Cl.
CPC .................... *C08L 7/00* (2013.01); *B60C 1/00* (2013.01); *C08L 9/00* (2013.01); *C08G 2650/58* (2013.01); *C08L 2205/02* (2013.01); *C08L 2205/035* (2013.01)

(58) Field of Classification Search
CPC ............. C08L 71/02; C08L 7/00; C08L 9/00
IPC ....................... C08L 71/02,7/00, 9/00
See application file for complete search history.

(56) References Cited

U.S. PATENT DOCUMENTS

| | | | |
|---|---|---|---|
| 5,876,527 A * | 3/1999 | Tsuruta | B60C 15/06 152/541 |
| 6,075,092 A | 6/2000 | Nakamura et al. | |
| 6,598,632 B1 | 7/2003 | Moreland et al. | |
| 2001/0051677 A1 | 12/2001 | Bataille et al. | |
| 2007/0141143 A1* | 6/2007 | Smithey | A61K 9/1635 424/464 |
| 2013/0102714 A1 | 4/2013 | Recker et al. | |
| 2014/0100321 A1 | 4/2014 | Maejima et al. | |

FOREIGN PATENT DOCUMENTS

| | | | | |
|---|---|---|---|---|
| JP | 5-194790 A | 8/1993 | | |
| JP | 2001-200105 A | 7/2001 | | |
| JP | 2003-504478 A | 2/2003 | | |
| JP | 2005-502753 A | 1/2005 | | |
| JP | 2006-213864 A | 8/2006 | | |
| JP | 2007-269964 A | 10/2007 | | |
| JP | 2009-137403 A | 6/2009 | | |
| JP | 2012-172082 A | 9/2012 | | |
| JP | 2012-180386 A | 9/2012 | | |
| WO | WO 97/39055 A1 | 10/1997 | | |
| WO | WO 03/022914 A1 | 3/2003 | | |
| WO | WO 2012004054 A1 * | 1/2012 | ............... | C08K 3/04 |
| WO | WO 2012/144605 A1 | 10/2012 | | |

OTHER PUBLICATIONS

Machine translation of WO 2012/004054 A1, Jan. 2012.*
Extended European Search Report for EP 14 81 4555, dated Nov. 2, 2016.
Paschalis Alexandridis and T. Alan Hatton, "Poly(ethylene oxide)-poly(propylene oxide)-poly(ethylene oxide) block copolymer surfactants in aqueous solutions and at inerfaces: thermodynamics, structure, dynamics, and modeling", Colloids and Surfaces A: Physiochemical and Engineering Aspects, vol. 96, pp. 1-46 (1995).
Dick, "Rubber Technology: Compounding and Testing for Performance," Feb. 28, 2005, p. 317-319 (6 pages).
English translation of the Chinese Office Action and Search Report, dated Nov. 7, 2016, for counterpart Chinese Application No. 201480032257.3.

* cited by examiner

*Primary Examiner* — Vickey Nerangis
(74) *Attorney, Agent, or Firm* — Birch, Stewart, Kolasch & Birch, LLP

(57) ABSTRACT

Provided are a rubber composition for tires, capable of improving discoloration resistance and tire appearance while maintaining good handling stability, crack resistance, and ozone resistance or improving these properties, and a pneumatic tire formed from the rubber composition. The present invention relates to a rubber composition for tires including a rubber component having a combined amount of polybutadiene rubber, natural rubber, and polyisoprene rubber of 90% by mass or more based on 100% by mass of a rubber component; sulfur; a pluronic nonionic surfactant in an amount of 0.1 to 5.0 parts by mass per 100 parts by mass of the rubber component; and carbon black in an amount of 2 to 70 parts by mass per 100 parts by mass of the rubber component.

19 Claims, 1 Drawing Sheet

10μm

10μm

RUBBER COMPOSITION FOR TIRES, AND PNEUMATIC TIRE

TECHNICAL FIELD

The present invention relates to a rubber composition for tires and a pneumatic tire formed from the rubber composition.

BACKGROUND ART

Tires for vehicles are formed from rubber compositions containing natural rubber and/or synthetic diene rubbers as raw materials. Such tires deteriorate in the presence of ozone and may then be cracked. In order to suppress crack formation and growth in the presence of ozone, for example, additives such as an antioxidant (e.g. N-(1,3-dimethylbutyl)-N'-phenyl-p-phenylenediamine (6PPD), poly(2,2,4-trimethyl-1,2)dihydroquinoline (TMDQ)) or petroleum wax are added to rubber compositions.

The antioxidants and petroleum wax in vulcanized rubber migrate (bloom) to the surface of rubber such as tires, thereby protecting the rubber from ozone. However, excessive blooming of the antioxidants and petroleum wax in a short time causes white discoloration. Moreover, the antioxidants degraded by ozone cause brown discoloration, and similar excessive blooming of them intensifies brown discoloration. In addition, if the wax and the like bloomed on the tire surface form irregularities, diffused reflection of light occurs, making the brown discoloration caused by the degraded antioxidants more noticeable. Thus, the shine of the tires is also lost.

Patent Literature 1 discloses that addition of a polyoxyethylene ether nonionic surfactant prevents deterioration of tire appearance. However, there is room for improvement in discoloration resistance and tire appearance while maintaining good handling stability, crack resistance, and ozone resistance or improving these properties.

CITATION LIST

Patent Literature

Patent Literature 1: JP H05-194790 A

SUMMARY OF INVENTION

Technical Problem

The present invention aims to solve the above problems and to provide a rubber composition for tires, capable of improving discoloration resistance and tire appearance while maintaining good handling stability, crack resistance, and ozone resistance or improving these properties, and to provide a pneumatic tire formed from the rubber composition.

Solution to Problem

One aspect of the present invention relates to a rubber composition for tires, including:
a rubber component having a combined amount of polybutadiene rubber, natural rubber, and polyisoprene rubber of 90% by mass or more based on 100% by mass of the rubber component,
sulfur;
a pluronic nonionic surfactant in an amount of 0.1 to 5.0 parts by mass per 100 parts by mass of the rubber component; and
carbon black in an amount of 2 to 70 parts by mass per 100 parts by mass of the rubber component.

The rubber composition for tires preferably includes 0.1 to 6.0 parts by mass of the sulfur per 100 parts by mass of the rubber component.

In the rubber composition for tires, an amount of the polybutadiene rubber is preferably 30% by mass or more based on 100% by mass of the rubber component.

The rubber composition for tires preferably includes 0 to 40 parts by mass of silica per 100 parts by mass of the rubber component.

The rubber composition for tires is preferably used as at least one of a rubber composition for sidewalls, rubber composition for clinches, or rubber composition for wings.

Another aspect of the present invention relates to a pneumatic tire, including a tire component formed from the rubber composition.

The tire component is preferably at least one of a sidewall, clinch, or wing.

Advantageous Effects of Invention

The rubber composition for tires of the present invention contains a rubber component having a combined amount of polybutadiene rubber, natural rubber, and polyisoprene rubber of 90% by mass or more based on 100% by mass of the rubber component; sulfur; a pluronic nonionic surfactant in an amount of 0.1 to 5.0 parts by mass per 100 parts by mass of the rubber component; and carbon black in an amount of 2 to 70 parts by mass per 100 parts by mass of the rubber component. Such a composition enables an improvement in discoloration resistance and tire appearance while maintaining good handling stability, crack resistance, and ozone resistance or improving these properties. Therefore, the present invention can provide a pneumatic tire excellent in handling stability, crack resistance, ozone resistance, discoloration resistance, and tire appearance.

DESCRIPTION OF EMBODIMENTS

Figure 1:
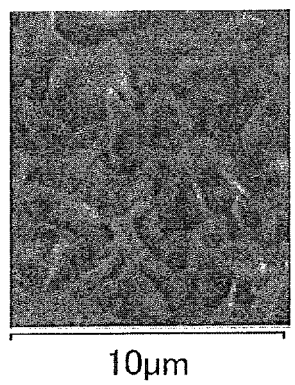
FIG. 1 is a SEM photograph of a sidewall surface of a tire of Comparative Example 1.

The rubber composition for tires of the present invention contains a rubber component having a combined amount of polybutadiene rubber, natural rubber, and polyisoprene rubber of 90% by mass or more based on 100% by mass of the rubber component; sulfur; a pluronic nonionic surfactant in an amount of 0.1 to 5.0 parts by mass per 100 parts by mass of the rubber component; and carbon black in an amount of 2 to 70 parts by mass per 100 parts by mass of the rubber component.

In the present invention, since a specific amount of a specific nonionic surfactant is added to a rubber composition which contains a specific rubber component, a specific amount of carbon black, and a specific amount of sulfur, the irregularities (bloom layer) formed on the tire surface due to blooming of wax and the like are smoothened so that diffused reflection of light can be suppressed. This also reduces the brown discoloration and the white discoloration described above, thus improving discoloration resistance. Furthermore, this also imparts, for example, adequate black appearance and shine to the tire surface, thus improving tire appearance. At the same time, good handling stability, crack resistance, and ozone resistance can be maintained or improved.

In addition, the rubber composition can improve tire appearance while maintaining or improving handling stability, crack resistance, and ozone resistance as described above, presumably because the presence of the specific nonionic surfactant properly controls the compatibility between the rubber composition and the specific nonionic surfactant.

The rubber composition of the present invention includes at least one rubber selected from the group consisting of polybutadiene rubber (BR), natural rubber (NR), and polyisoprene rubber (IR). Each of these may be used alone, or two or more of these may be used in combination. In particular, NR or BR is preferred, and a combination of NR and BR is more preferred, because the effects of the present invention can be more suitably achieved.

Examples of the NR include rubbers generally used in the tire industry, such as SIR20, RSS#3, and TSR20. Each of these may be used alone, or two or more of these may be used in combination.

In cases where the rubber composition contains NR, the amount of NR based on 100% by mass of the rubber component is preferably 20% by mass or more, more preferably 30% by mass or more, still more preferably 40% by mass or more. The amount of NR is preferably 80% by mass or less, more preferably 60% by mass or less. When the amount of NR is within the range described above, the effects of the present invention can be more suitably achieved.

Examples of the IR include, but are not limited to, rubbers generally used in the tire industry. Each of these may be used alone, or two or more of these may be used in combination.

In cases where the rubber composition contains IR, the amount of IR based on 100% by mass of the rubber component is preferably 5% by mass or more, more preferably 10% by mass or more. The amount of IR is preferably 40% by mass or less, more preferably 25% by mass or less. When the amount of IR is within the range described above, the effects of the present invention can be more suitably achieved.

Examples of the BR include, but are not limited to, high-cis BR such as BR730 and BR51 available from JSR, BR1220 available from ZEON CORPORATION, and BR130B, BR150B, and BR710 available from UBE INDUSTRIES, LTD.; low-cis BR such as BR1250H available from ZEON CORPORATION; and BR containing 1,2-syndiotactic polybutadiene crystals (SPB) (SPB-containing BR) such as VCR412 and VCR617 available from UBE INDUSTRIES, LTD. Each of these may be used alone, or two or more of these may be used in combination. In particular, SPB-containing BR is preferred because the effects of the present invention can be more suitably achieved. Further, combinations of SPB-containing BR with BR other than SPB-containing BR (e.g., high-cis BR or low-cis BR) are more preferred because the effects of the present invention can be still more suitably achieved.

1,2-syndiotactic polybutadiene crystals (SPB) in SPB-containing BR are not only dispersed in the SPB-containing BR, but they are also preferably chemically bonded to the SPB-containing BR, and dispersed without alignment. The occurrence and propagation of cracks tend to be suppressed by dispersing the crystals chemically bonded to the rubber component.

The 1,2-syndiotactic polybutadiene crystal content in the SPB-containing BR is preferably 2.5% by mass or more, more preferably 8% by mass or more. If the content is less than 2.5% by mass, a rubber composition with sufficient hardness (handling stability) tends not to be obtained. The content is preferably 22% by mass or less, more preferably 18% by mass or less, still more preferably 15% by mass or less. When the content is within the range described above, the effects of the present invention can be more suitably achieved.

In cases where the rubber composition contains SPB-containing BR, the amount of SPB-containing BR based on 100% by mass of the rubber component is preferably 5% by mass or more, more preferably 15% by mass or more. Further, the amount of SPB-containing BR is preferably 50% by mass or less, more preferably 35% by mass or less. When the amount of SPB-containing BR is within the range described above, the effects of the present invention can be more suitably achieved.

In cases where the rubber composition contains BR, the amount of BR based on 100% by mass of the rubber component is preferably 30% by mass or more, more preferably 40% by mass or more. The amount of BR is preferably 70% by mass or less, more preferably 60% by mass or less. When the amount of BR is within the range described above, the effects of the present invention can be more suitably achieved.

In the rubber composition for tires of the present invention, the combined amount of polybutadiene rubber, natural rubber, and polyisoprene rubber, preferably the combined amount of polybutadiene rubber and natural rubber, is 90% by mass or more, preferably 95% by mass or more based on 100% by mass of the rubber component. The combined amount may be 100% by mass. If the combined amount is less than 90% by mass, crack resistance and ozone resistance deteriorate.

In addition to BR, NR, and IR, any rubber may be used. Examples thereof include diene rubbers such as styrene-butadiene rubber (SBR), styrene-isoprene-butadiene rubber (SIBR), chloroprene rubber (CR), acrylonitrile-butadiene rubber (NBR), ethylene-propylene-diene rubber (EPDM), butyl rubber (IIR), and halogenated butyl rubber (X-IIR). Each of the rubbers may be used alone, or two or more of these may be used in combination.

In the present invention, a pluronic nonionic surfactant is used. A pluronic nonionic surfactant is also called a polyoxyethylene polyoxypropylene glycol, a polyoxyethylene polyoxypropylene block polymer, or a polypropylene glycol ethylene oxide adduct, and is generally a nonionic surfactant represented by the formula (I) below. As shown in the formula (I), the pluronic nonionic surfactant contains on both sides thereof a hydrophilic group having an ethylene oxide structure, and also contains a hydrophobic group having a propylene oxide structure between the hydrophilic groups.

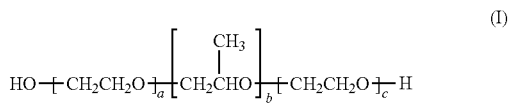

(I)

In the formula (I), a, b, and c each represent an integer.

The degree of polymerization of the polypropylene oxide block of the pluronic nonionic surfactant, which is represented by b in the formula (I), and the number of polyethylene oxide units added, which is represented by a+c in the formula (I), are not particularly limited, and may be appropriately selected depending on the service conditions, intended purpose, or the like. A surfactant with a higher proportion of the polypropylene oxide block tends to have higher affinity for rubber and thus to migrate to the rubber surface at a slower rate. In particular, in order to suitably control blooming of the nonionic surfactant and more suitably achieve the effects of the present invention, the degree of polymerization of the polypropylene oxide block, which is represented by b in the formula (I), is preferably 100 or less, more preferably 10 to 70, still more preferably 10 to 60, particularly preferably 20 to 60, most preferably 20 to 45. For the same reason as above, the number of polyethylene oxide units added, which is represented by a+c in the formula (I), is preferably 100 or less, more preferably 3 to 65, still more preferably 5 to 55, particularly preferably 5 to 40, most preferably 10 to 40. When the degree of polymerization of the polypropylene oxide block and the number of polyethylene oxide units added are within the respective ranges described above, blooming of the nonionic surfactant can be suitably controlled, and the effects of the present invention can be more suitably achieved.

Examples of the pluronic nonionic surfactant include pluronic series available from BASF Japan Ltd., NEWPOL PE series available from Sanyo Chemical Industries, Ltd., Adeka pluronic L or F series available from ADEKA CORPORATION, EPAN series available from DAI-ICHI KOGYO SEIYAKU CO., LTD., and Pronon series or UNILUBE available from NOF CORPORATION. Each of these may be used alone, or two or more of these may be used in combination.

The amount of pluronic nonionic surfactant is preferably 0.1 parts by mass or more, more preferably 0.3 parts by mass or more, still more preferably 0.6 parts by mass or more, particularly preferably 1 part by mass or more, most preferably 1.2 parts by mass or more, per 100 parts by mass of the rubber component. If the amount thereof is less than 0.1 parts by mass, the effects of the present invention may not be sufficiently obtained. The amount thereof is preferably 5.0 parts by mass or less, more preferably 4.0 parts by mass or less, still more preferably 3.0 parts by mass or less. If the amount thereof is more than 5.0 parts by mass, handling stability, crack resistance, ozone resistance, or discoloration resistance may deteriorate.

In the present invention, sulfur is used to form appropriate bridges in polymer chains. As a result, blooming of the nonionic surfactant can be suitably controlled. Thus, the effects of the present invention can be well achieved. Examples of the sulfur include powdered sulfur, precipitated sulfur, colloidal sulfur, insoluble sulfur, highly dispersive sulfur, and soluble sulfur which are commonly used in the rubber industry. Each of these may be used alone, or two or more of these may be used in combination.

The amount of sulfur is preferably 0.1 parts by mass or more, more preferably 0.5 parts by mass or more, still more preferably 1.0 part by mass or more, per 100 parts by mass of the rubber component. If the amount thereof is less than 0.1 parts by mass, the effects of the present invention may not be sufficiently obtained. The amount of sulfur is preferably 6.0 parts by mass or less, more preferably 5.0 parts by mass or less, still more preferably 4.0 parts by mass or less, particularly preferably 3.0 parts by mass or less. If the amount thereof is more than 6.0 parts by mass, handling stability, ozone resistance, discoloration resistance, or tire appearance may deteriorate.

In the present invention, in addition to sulfur, an alkylphenol-sulfur chloride condensate (e.g. Tackirol V200 available from Taoka Chemical Co., Ltd.) may be used as a vulcanizing agent.

In the present invention, a specific amount of carbon black is used. This use provides good reinforcing properties and also provides good handling stability, crack resistance, and ozone resistance. The addition of a large amount of carbon black may cause deterioration in appearance; however, in the present invention, the deterioration of appearance is suppressed by controlling the amount of carbon black to a specific range. Furthermore, blooming of the nonionic surfactant can be suitably controlled, and the effects of the present invention can be well achieved.

Specifically, the amount of carbon black is 2 parts by mass or more, preferably 15 parts by mass or more, more preferably 25 parts by mass or more, per 100 parts by mass of the rubber component. If the amount thereof is less than 2 parts by mass, sufficient reinforcing properties may not be obtained. The amount thereof is 70 parts by mass or less, preferably 60 parts by mass or less, more preferably 50 parts by mass or less. If the amount thereof is more than 70 parts by mass, handling stability and ozone resistance tend to deteriorate.

Examples of the carbon black include, but are not limited to, GPF, FEF, HAF, ISAF, and SAF. Each of these may be used alone, or two or more of these may be used in combination.

The carbon black has a nitrogen adsorption specific surface area ($N_2SA$) of preferably 20 $m^2/g$ or larger, more preferably 50 $m^2/g$ or larger. A carbon black with a $N_2SA$ smaller than 20 $m^2/g$ may not provide sufficient reinforcing properties. The $N_2SA$ is preferably 180 $m^2/g$ or smaller, more preferably 120 $m^2/g$ or smaller, still more preferably 90 $m^2/g$ or smaller, particularly preferably 80 $m^2/g$ or smaller. A carbon black with a $N_2SA$ larger than 180 $m^2/g$ is difficult to be dispersed, and handling stability, crack resistance, and ozone resistance therefore tend to deteriorate.

Here, the $N_2SA$ of carbon black can be determined in accordance with JIS K 6217-2:2001.

The carbon black has a dibutyl phthalate oil absorption (DBP) of preferably 50 ml/100 g or more, more preferably 80 ml/100 g or more. A carbon black with a DBP less than 50 ml/100 g may not provide sufficient reinforcing properties. Further, the DBP of the carbon black is preferably 200 ml/100 g or less, more preferably 135 ml/100 g or less, still more preferably 115 ml/100 g or less. A carbon black with a DBP larger than 200 ml/100 g is difficult to be dispersed. Therefore, handling stability, crack resistance, and ozone resistance tend to deteriorate.

The DBP of carbon black is determined in accordance with JIS K 6217-4:2001.

In the present invention, silica may be used together with a specific amount of carbon black. Addition of silica further improves tire appearance. Examples of the silica include, but are not limited to, dry silica (anhydrous silica) and wet silica (hydrous silica). Each of these may be used alone, or two or more of these may be used in combination. Preferred among these is wet silica because it contains many silanol groups.

The nitrogen adsorption specific surface area ($N_2SA$) of the silica is preferably 50 $m^2/g$ or larger, more preferably 100 $m^2/g$ or larger, still more preferably 150 $m^2/g$ or larger. If the $N_2SA$ thereof is smaller than 50 $m^2/g$, handling stability, crack resistance, and ozone resistance tend to deteriorate. The $N_2SA$ is preferably 250 $m^2/g$ or smaller, more preferably 210 $m^2/g$ or smaller. Silica with a $N_2SA$ of larger than 250 m²/g is difficult to be dispersed. Therefore, handling stability, crack resistance, and ozone resistance tend to deteriorate.

Here, the $N_2SA$ of silica is determined by the BET method in accordance with ASTM D3037-93.

In cases where the rubber composition contains silica, the amount of silica is preferably 3 parts by mass or more, more preferably 10 parts by mass or more, still more preferably 20 parts by mass or more, per 100 parts by mass of the rubber component. Further, the amount of silica is preferably 40 parts by mass or less. If the amount of silica is more than 40 parts by mass, crack resistance, ozone resistance, discoloration resistance, and tire appearance tend to deteriorate. When the amount of silica is within the range described above, tire appearance can be more improved while providing a reinforcing effect.

In cases where the rubber composition of the present invention contains silica, the rubber composition preferably contains a silane coupling agent together with silica.

The silane coupling agent may be any conventional one used with silica in the rubber industry. Examples thereof include sulfide silane coupling agents such as bis(3-triethoxysilylpropyl)disulfide, mercapto silane coupling agents such as 3-mercaptopropyltrimethoxysilane, vinyl silane coupling agents such as vinyltriethoxysilane, amino silane coupling agents such as 3-aminopropyltriethoxysilane, glycidoxy silane coupling agents such as γ-glycidoxypropyltriethoxysilane, nitro silane coupling agents such as 3-nitropropyltrimethoxysilane, and chloro silane coupling agents such as 3-chloropropyltrimethoxysilane. Each of these may be used alone, or two or more of these may be used in combination. In particular, sulfide silane coupling agents are preferred, and bis(3-triethoxysilylpropyl)disulfide is more preferred.

In cases where the rubber composition contains a silane coupling agent, the amount of silane coupling agent is preferably 2 parts by mass or more, more preferably 5 parts by mass or more, per 100 parts by mass of the silica. If the amount thereof is less than 2 parts by mass, handling stability, crack resistance, and ozone resistance tend to deteriorate. Further, the amount of silane coupling agent is preferably 20 parts by mass or less, more preferably 12 parts by mass or less. If the amount thereof is more than 20 parts by mass, effects commensurate with an increase in cost tend not to be provided.

In the present invention, wax is preferably added in order to suppress crack formation and growth due to ozone. In the present invention, even when wax is added, the irregularities (bloom layer) formed on the tire surface due to blooming of wax and the like are smoothened so that diffused reflection of light can be suppressed, as described above. Therefore, the brown discoloration and white discoloration described above can be reduced. The wax also imparts, for example, adequate black appearance and shine to the tire surface, thus improving tire appearance. Furthermore, since the present invention uses a specific rubber composition, good handling stability, crack resistance, and ozone resistance are maintained or improved.

Examples of the wax include, but are not limited to, petroleum waxes and natural waxes. In addition, synthetic waxes prepared by purification or chemical treatment of plural waxes may be used. Each of these waxes may be used alone, or two or more of these may be used in combination.

Examples of the petroleum waxes include paraffin wax and microcrystalline wax. The natural waxes are not limited as long as they are non-petroleum derived waxes. Examples thereof include plant waxes such as candelilla wax, carnauba wax, Japan wax, rice wax, and jojoba wax; animal waxes such as beeswax, lanolin, and cetaceum; mineral waxes such as ozokerite, ceresin, and petrolatum; and purified products thereof.

In cases where the rubber composition contains a wax, the amount of wax is preferably 0.5 parts by mass or more, more preferably 1.0 part by mass or more, per 100 parts by mass of the rubber component. If the amount thereof is less than 0.5 parts by mass, ozone resistance may not be sufficiently obtained. Further, the amount of wax is preferably 12 parts by mass or less, more preferably 10 parts by mass or less, still more preferably 5.0 parts by mass or less. If the amount thereof is more than 12 parts by mass, no further improvement in ozone resistance is expected despite an increase in costs.

The rubber composition of the present invention may contain an oil. The addition of oil improves processability and imparts flexibility to the resulting tire, with the result that the effects of the present invention can be better achieved. Examples of the oil include process oils, plant fats and/or oils, and the mixture thereof. Examples of the process oils include paraffinic process oil, aromatic process oil, and naphthenic process oil. Specific examples of the paraffinic process oil include PW-32, PW-90, PW-150, and PS-32 available from Idemitsu Kosan Co., Ltd. Specific examples of the aromatic process oil include AC-12, AC-460, AH-16, AH-24, and AH-58 available from Idemitsu Kosan Co., Ltd. Examples of the plant fats and/or oils include castor oil, cottonseed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. Each of these may be used alone, or two or more of these may be used in combination. Preferred among these is paraffinic process oil because the effects of the present invention can be suitably achieved.

In cases where the rubber composition contains an oil, the amount of oil is preferably 0.5 parts by mass or more, more preferably 1.0 part by mass or more, still more preferably 2.0 parts by mass or more, per 100 parts by mass of the rubber component. Further, the amount of oil is preferably 60 parts by mass or less, more preferably 15 parts by mass or less, still more preferably 12 parts by mass or less, particularly preferably 10 parts by mass or less, most preferably 8.0 parts by mass or less. Although oil also blooms to the tire surface, when the amount of oil is within the above range, blooming of the nonionic surfactant can be suitably controlled, and the effects of the present invention can be more suitably achieved. If the amount of oil is more than 60 parts by mass, fuel efficiency tends to deteriorate.

The rubber composition of the present invention preferably contains an antioxidant to suppress crack formation and growth due to ozone. In the present invention, as described above, even when an antioxidant is added, good fuel efficiency and good abrasion resistance can be maintained or improved, brown discoloration or white discoloration can be reduced, and discoloration resistance and tire appearance can be improved.

Examples of the antioxidant include, but are not limited to, naphthyl amine, quinoline, diphenyl amine, p-phenylenediamine, hydroquinone derivative, phenol (monophenol, bisphenol, trisphenol, polyphenol), thiobisphenol, benzoimidazole, thiourea, phosphite, and organic thioacid antioxidants. Each of these may be used alone, or two or more of these may be used in combination. In particular, p-phenylenediamine antioxidants are preferred because they have good ozone resistance, and the effects of the present invention can be more suitably achieved.

Examples of the p-phenylenediamine antioxidants include N-(1,3-dimethylbutyl)-N'-phenyl-p-phenylenediamine, N-isopropyl-N'-phenyl-p-phenylenediamine, N-1,4-dimethylpentyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-4-methyl-2-pentyl-N'-phenyl-p-phenylenediamine, N,N'-diaryl-p-phenylenediamine, hindered diaryl-p-phenylenediamine, phenylhexyl-p-phenylenediamine, and phenyloctyl-p-phenylenediamine. Each of these may be used alone, or two or more of these may be used in combination. In particular, N-(1,3-dimethylbutyl)-N'-phenyl-p-phenylenediamine is more preferred because it has good ozone resistance and the effects of the present invention can be more suitably achieved, and also because it is economically advantageous.

In cases where the rubber composition contains an antioxidant, the amount of antioxidant is preferably 0.3 parts by mass or more, more preferably 0.5 parts by mass or more, still more preferably 1.0 part by mass or more, per 100 parts by mass of the rubber component. If the amount thereof is less than 0.3 parts by mass, ozone resistance may not be sufficiently obtained. The amount of antioxidant is preferably 10 parts by mass or less, more preferably 6.0 parts by mass or less, still more preferably 3.0 parts by mass or less, particularly preferably 2.5 parts by mass or less. If the amount thereof is more than 10 parts by mass, the amount of blooms of the antioxidant may increase, deteriorating tire appearance.

The rubber composition of the present invention preferably contains a vulcanization accelerator. Examples of the vulcanization accelerator include sulfenamide, thiazole, thiuram, thiourea, guanidine, dithiocarbamate, aldehyde-amine, aldehyde-ammonia, imidazoline, and xanthate vulcanization accelerators. Each of these vulcanization accelerators may be used alone, or two or more of these may be used in combination. Preferred among these are sulfenamide vulcanization accelerators because the effects of the present invention can be more suitably achieved.

Examples of the sulfenamide vulcanization accelerators include N-tert-butyl-2-benzothiazolylsulfenamide (TBBS), N-cyclohexyl-2-benzothiazolylsulfenamide (CBS), and N,N-dicyclohexyl-2-benzothiazolylsulfenamide (DCBS). Each of these may be used alone, or two or more of these may be used in combination. Preferred among these is TBBS because the effects of the present invention can be more suitably achieved.

In cases where the rubber composition contains a vulcanization accelerator, the amount of vulcanization accelerator is preferably 0.3 parts by mass or more, more preferably 0.5 parts by mass or more, per 100 parts by mass of the rubber component. The amount thereof is preferably 5.0 parts by mass or less, more preferably 3.0 parts by mass or less. If the amount of vulcanization accelerator is within the range described above, the effects of the present invention can be more suitably achieved.

In addition to the above-described components, the rubber composition of the present invention may appropriately contain other additives usually used to prepare rubber compositions, such as zinc oxide, stearic acid, or tackifiers.

The rubber composition of the present invention can be prepared by any known method such as those including kneading the above components using a rubber kneader such as an open roll mill or Banbury mixer, followed by vulcanization.

The rubber composition of the present invention can be suitably used for tire components. In particular, the rubber composition can be used in, for example, a sidewall, clinch, and/or wing which form a tire (outer) surface that is required to have good ozone resistance, good discoloration resistance, and good tire appearance.

The sidewall is a component extending from a shoulder portion to a bead portion, located outside a carcass. Specifically, it is a component shown in, for example, FIG. 1 of JP 2005-280612 A and FIG. 1 of JP 2000-185529 A.

The clinch is a rubber portion that is located at a lower portion of a sidewall and covers a portion that is to be in contact with a rim, and is also referred to as a clinch apex or a rubber chafer. Specifically, it is a component shown in, for example, FIG. 1 of JP 2008-75066 A.

The wing is a component located between a tread and a sidewall at a shoulder portion. Specifically, it is a component shown in, for example, FIGS. 1 and 3 of JP 2007-176267 A.

The pneumatic tire of the present invention can be formed by usual methods using the rubber composition.

Specifically, an unvulcanized rubber composition containing the aforementioned components is extruded and processed into shapes of a sidewall, a clinch, and a wing, and then formed together with other tire components in a usual manner on a tire building machine to build an unvulcanized tire. This unvulcanized tire is then heated and pressurized in a vulcanizer to give a tire.

The pneumatic tire of the present invention is used as a tire for passenger cars, a tire for trucks and buses, a tire for motorcycles, or a high-performance tire. The high-performance tire herein means a tire particularly excellent in grip performance, and conceptually includes a racing tire used in a racing vehicle.

EXAMPLES

The present invention will be specifically described with reference to examples. However, the present invention is not limited only these examples.

The respective chemical agents used in examples and comparative examples are listed below.

NR: RSS#3
IR: IR2200 available from ZEON CORPORATION
BR1: BR150B (cis content: 97% by mass) available from UBE INDUSTRIES, LTD.
BR2: VCR412 (polybutadiene rubber containing 1,2-syndiotactic polybutadiene crystals (SPB-containing BR), 1,2-syndiotactic polybutadiene crystal content: 12% by mass) available from UBE INDUSTRIES, LTD.
BR3: BR1250H (low-cis BR) available from ZEON CORPORATION
SBR: SBR1502 available from ZEON CORPORATION
Carbon black: SHOBLACK N330 ($N_2SA$: 75 $m^2/g$, DBP: 102 ml/100 g) available from Cabot Japan K.K.
Silica: ULTRASIL VN3 ($N_2SA$: 175 $m^2/g$) available from Evonik Degussa
Silane coupling agent: Si266 (bis(3-triethoxysilylpropyl) disulfide) available from Evonik Degussa
Wax: Sunnoc wax available from Ouchi Shinko Chemical Industrial Co., Ltd.
Oil: Process oil PW-32 (paraffinic process oil) available from Idemitsu Kosan Co., Ltd.
Surfactant 1: NEWPOL PE-64 (pluronic nonionic surfactant (PEG/PPG-25/30 copolymer)) (in the formula (I), a+c: 25, b: 30) available from Sanyo Chemical Industries, Ltd.

Surfactant 2: NEWPOL PE-74 (pluronic nonionic surfactant (PEG/PPG-30/35 copolymer)) (in the formula (I), a+c: 30, b: 35) available from Sanyo Chemical Industries, Ltd.
Surfactant 3: polyoxyethylene sorbitan monostearate available from KANTO CHEMICAL CO., INC.
Surfactant 4: polyoxyethylene sorbitan trioleate available from KANTO CHEMICAL CO., INC.
Surfactant 5: polyoxyethylene dodecyl ether available from KANTO CHEMICAL CO., INC.
Surfactant 6: ethylene glycol dibutyl ether available from Tokyo Chemical Industry Co., Ltd.
Antioxidant: Nocrac 6C (N-(1,3-dimethylbutyl)-N'-phenyl-p-phenylenediamine) available from Ouchi Shinko Chemical Industrial Co., Ltd.
Stearic acid: stearic acid available from NOF Corporation
Sulfur: powdered sulfur available from Tsurumi Chemical industry Co., Ltd.
V200: Tackirol V200 (alkylphenol-sulfur chloride condensate) available from Taoka Chemical Co., Ltd.
Zinc oxide: Zinc oxide #1 available from Mitsui Mining & Smelting Co., Ltd.
Vulcanization accelerator: NOCCELER NS (N-tert-butyl-2-benzothiazolyl sulfenamide) available from Ouchi Shinko Chemical Industrial Co., Ltd.

Chemical agents other than sulfur, V200, and a vulcanization accelerator were kneaded in a 1.7-L Banbury mixer until the temperature reached 180° C. according to each of the formulation amounts shown in Tables 1 and 2. Then, sulfur, V200, and a vulcanization accelerator were added to the resulting kneaded mixture and they were kneaded using an open roll mill until the temperature reached 105° C. to prepare an unvulcanized rubber composition. The unvulcanized rubber composition was press vulcanized at 160° C. for 15 minutes to prepare a vulcanized rubber composition.

The resulting vulcanized rubber compositions were evaluated in the following ways. The results are shown in Tables 1 and 2. Here, Comparative Example 1 and Comparative Example 6 are taken as reference comparative examples in Tables 1 and 2, respectively.
<Measurement of Hardness>

The hardness of each vulcanized rubber composition was measured in accordance with JIS K 6253 using a hardness meter at a temperature of 25° C. (Shore-A measurement). The hardness values are expressed as an index calculated from the equation: (hardness of each formulation)/(hardness of reference comparative example)×100, wherein the value of the reference comparative example is set equal to 100. A larger index value indicates better handling stability.
<Elongation at Break>

A No. 3 dumbbell-shaped test piece was prepared from each vulcanized rubber composition and then subjected to a tensile test at room temperature according to JIS K 6251 "Rubber, vulcanized or thermoplastics—Determination of tensile stress-strain properties," to measure the elongation at break EB (%). The EB values are expressed as an index calculated from the equation: (EB of each formulation)/(EB of reference comparative example)×100, wherein the value of reference comparative example is set equal to 100. A larger index value indicates better crack resistance. The target EB index value is 98 or more.
<Evaluation of Ozone Resistance>

A test piece with a predetermined size was prepared from each of the obtained vulcanized rubber compositions and subjected to a dynamic ozone-deterioration test according to JIS K 6259 "Rubber, vulcanized or thermoplastics—Determination of ozone resistance". The test was carried out for 48 hours at a frequency of reciprocation of 0.5±0.025 Hz, an ozone concentration of 50±5 pphm, a test temperature of 40° C., and a tensile strain of 20±2%. After the test, crack conditions (the presence or absence of cracks) were measured to evaluate ozone resistance. A larger index value indicates a smaller number of cracks, a smaller size of cracks, and better ozone resistance.
<Evaluation of Discoloration Resistance>

The sample obtained after the test for ozone resistance was measured for a and b values (L*a*b* color system) with a chroma meter (CR-310) available from Conica Minolta, Inc. The value of $(a^2+b^2)^{-0.5}$ was used as a parameter and the results were expressed as an index calculated from the equation: (parameter of each formulation)/(parameter of reference comparative example)×100, wherein the parameter of reference comparative example was set equal to 100. A larger index value indicates less discoloration and better discoloration resistance.
<Evaluation of Appearance>

The appearance of the sample obtained after the test for ozone resistance was evaluated outdoors based on the following criteria.
AA: shiny and darker black than reference comparative example
A: slightly shiny and darker black than reference comparative example
B: brown similar to reference comparative example
C: darker brown than reference comparative example
<Evaluation with Scanning Electron Microscope (SEM)>

Figure 2:
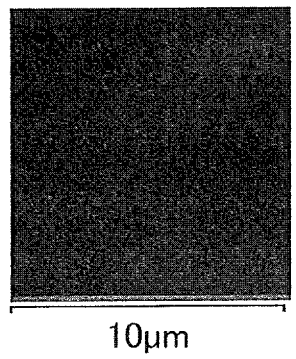
FIG. 2 is a SEM photograph of a sidewall surface of a tire of Example 1.

The obtained unvulcanized rubber composition was formed into the shape of a sidewall, and assembled with other tire components to prepare an unvulcanized tire. The unvulcanized tire was vulcanized at 170° C. to provide a test tire (Example 1 and Comparative Example 1). The test tire was exposed to sunlight outdoors for 30 days while it was protected from rain. Then, the sidewall portion was cut off and observed using a scanning electron microscope (SEM) XL30 ESEM available from Philips Electron Optics. The results are shown in FIG. 1 (Comparative Example 1) and FIG. 2 (Example 1). FIGS. 1 and 2 show that the surface of the sidewall of Example 1 was kept flat, whereas irregularities due to wax and the like were observed on the surface of the sidewall of Comparative Example 1. The sidewall of Example 1 was black and had a good appearance. On the other hand, the sidewall of Comparative Example 1 was brown and had a poor appearance.

TABLE 1

|  |  | Example |  |  |  |  |  |  |  | Comparative Example |  |  |  |  |
|---|---|---|---|---|---|---|---|---|---|---|---|---|---|---|
|  |  | 1 | 2 | 3 | 4 | 5 | 6 | 7 | 8 | 1 | 2 | 3 | 4 | 5 |
| Formulation amount (part(s) by mass) | NR | 50 | 50 | 50 | 70 | 50 | 50 | 45 | 50 | 50 | 50 | 50 | 50 | 50 |
|  | BR1 | 25 | 25 | 25 | 15 | 25 | 25 | 22 | — | 25 | 25 | 25 | 25 | 25 |
|  | BR2 | 25 | 25 | 25 | 15 | 25 | 25 | 25 | 25 | 25 | 25 | 25 | 25 | 25 |
|  | BR3 | — | — | — | — | — | — | — | 25 | — | — | — | — | — |

TABLE 1-continued

|  |  | Example | | | | | | | | Comparative Example | | | | |
|---|---|---|---|---|---|---|---|---|---|---|---|---|---|---|
|  |  | 1 | 2 | 3 | 4 | 5 | 6 | 7 | 8 | 1 | 2 | 3 | 4 | 5 |
|  | SBR | — | — | — | — | — | — | 8 | — | — | — | — | — | — |
|  | Carbon black | 40 | 40 | 65 | 35 | 40 | 35 | 40 | 40 | 40 | 40 | 40 | 40 | 40 |
|  | Wax | 1.5 | 1.5 | 1.5 | 1.5 | — | 1.5 | — | 1.5 | 1.5 | 1.5 | 1.5 | 3.5 | 3.5 |
|  | Oil | 6.0 | 6.0 | 15.0 | 6.0 | 6.0 | 8.0 | 6.0 | 6.0 | 7.0 | 6.0 | 6.0 | 6.0 | 6.0 |
|  | Surfactant 1 | 1.5 | — | 1.5 | — | — | 1.5 | 1.5 | 1.5 | — | — | — | — | — |
|  | Surfactant 2 | — | 1.5 | — | 1.5 | 1.5 | — | — | — | — | — | — | — | — |
|  | Surfactant 3 | — | — | — | — | — | — | — | — | — | 1.5 | — | — | — |
|  | Surfactant 4 | — | — | — | — | — | — | — | — | — | — | 1.5 | — | — |
|  | Surfactant 5 | — | — | — | — | — | — | — | — | — | — | — | 1.5 | — |
|  | Surfactant 6 | — | — | — | — | — | — | — | — | — | — | — | — | 1.5 |
|  | Antioxidant | 2.0 | 2.0 | 2.0 | 2.0 | 2.0 | 2.0 | 2.0 | 2.0 | 2.0 | 2.0 | 2.0 | 2.0 | 2.0 |
|  | Stearic acid | 1.0 | 1.0 | 1.0 | 1.0 | 1.0 | 1.0 | 1.0 | 1.0 | 1.0 | 1.0 | 1.0 | 1.0 | 1.0 |
|  | Sulfur | 2.0 | 2.0 | 2.0 | 2.0 | 0.3 | 5.0 | 2.0 | 2.0 | 2.0 | 2.0 | 2.0 | 2.0 | 2.0 |
|  | V200 | — | — | — | — | 5.0 | — | — | — | — | — | — | — | — |
|  | Zinc oxide | 4.0 | 4.0 | 4.0 | 4.0 | 4.0 | 4.0 | 4.0 | 4.0 | 4.0 | 4.0 | 4.0 | 4.0 | 4.0 |
|  | Vulcanization accelerator | 1.0 | 1.0 | 1.0 | 1.0 | 0.5 | 1.0 | 1.0 | 1.0 | 1.0 | 1.0 | 1.0 | 1.0 | 1.0 |
| Evaluation results | Hardness index (handling stability) | 102 | 100 | 101 | 100 | 101 | 100 | 105 | 101 | 100 | 100 | 100 | 98 | 98 |
|  | EB index (crack resistance) | 99 | 99 | 101 | 99 | 99 | 100 | 100 | 100 | 100 | 96 | 96 | 97 | 95 |
|  | Ozone resistance | 102 | 101 | 100 | 100 | 100 | 101 | 100 | 104 | 100 | 99 | 99 | 98 | 98 |
|  | Discoloration resistance | 109 | 109 | 103 | 106 | 105 | 104 | 105 | 108 | 100 | 102 | 102 | 101 | 101 |
|  | Appearance | AA | AA | A | A | A | A | A | AA | B | A | A | A | A |

TABLE 2

|  |  | Example | | | Comparative Example | |
|---|---|---|---|---|---|---|
|  |  | 9 | 10 | 11 | 6 | 7 |
| Formulation amount (part(s) by mass) | NR | 33 | 33 | 33 | 33 | 33 |
|  | BR1 | 67 | 67 | 67 | 67 | 67 |
|  | Carbon black | 50 | 50 | 50 | 50 | 50 |
|  | Wax | 1.5 | 1.5 | 1.5 | 1.5 | 1.5 |
|  | Oil | 8.0 | 8.0 | 8.0 | 8.0 | 8.0 |
|  | Surfactant 1 | 0.7 | — | — | — | — |
|  | Surfactant 2 | — | 0.7 | 1.5 | — | — |
|  | Surfactant 3 | — | — | — | — | 1.5 |
|  | Antioxidant | 3.5 | 3.5 | 3.5 | 3.5 | 3.5 |
|  | Stearic acid | 2.0 | 2.0 | 2.0 | 2.0 | 2.0 |
|  | Sulfur | 1.7 | 1.7 | 1.7 | 1.7 | 1.7 |
|  | Zinc oxide | 3.5 | 3.5 | 3.5 | 3.5 | 3.5 |
|  | Vulcanization accelerator | 0.8 | 0.8 | 0.8 | 0.8 | 0.8 |
| Evaluation results | Hardness index (handling stability) | 101 | 100 | 101 | 100 | 97 |
|  | EB index (crack resistance) | 100 | 99 | 100 | 100 | 98 |
|  | Ozone resistance | 102 | 101 | 102 | 100 | 96 |
|  | Discoloration resistance | 105 | 104 | 108 | 100 | 102 |
|  | Appearance | A | A | AA | B | A |

In the examples in which the rubber composition contained a rubber component with a combined amount of polybutadiene rubber, natural rubber, and polyisoprene rubber of 90% by mass or more based on 100% by mass of the rubber component; sulfur; a pluronic nonionic surfactant in an amount of 0.1 to 5.0 parts by mass per 100 parts by mass of the rubber component; and carbon black in an amount of 2 to 70 parts by mass per 100 parts by mass of the rubber component, discoloration resistance and rubber (tire) appearance were improved while maintaining good handling stability, crack resistance, and ozone resistance or improving these properties.

The invention claimed is:

1. A rubber composition for tires, comprising:
    a rubber component having a combined amount of polybutadiene rubber, natural rubber, and polyisoprene rubber of 90% by mass or more based on 100% by mass of the rubber component;
    sulfur;
    a nonionic surfactant represented by the formula (I) below in an amount of 0.1 to 5.0 parts by mass per 100 parts by mass of the rubber component; and
    carbon black in an amount of 2 to 70 parts by mass per 100 parts by mass of the rubber component

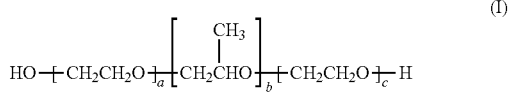

wherein a, b, and c each represent an integer, b is 20 to 40, and a+c is 10 to 48.

2. The rubber composition for tires according to claim 1, wherein the rubber composition for tires comprises 0.1 to 6.0 parts by mass of the sulfur per 100 parts by mass of the rubber component.

3. The rubber composition for tires according to claim 2, wherein an amount of the polybutadiene rubber is 30% by mass or more based on 100% by mass of the rubber component.

4. The rubber composition for tires according to claim 2, wherein the rubber composition for tires comprises 0 to 40 parts by mass of silica per 100 parts by mass of the rubber component.

5. The rubber composition for tires according to claim 1, wherein an amount of the polybutadiene rubber is 30% by mass or more based on 100% by mass of the rubber component.

6. The rubber composition for tires according to claim 5, wherein the rubber composition for tires comprises 0 to 40 parts by mass of silica per 100 parts by mass of the rubber component.

7. The rubber composition for tires according to claim 1, wherein the rubber composition for tires comprises 0 to 40 parts by mass of silica per 100 parts by mass of the rubber component.

8. The rubber composition for tires according to claim 1, wherein the rubber composition excludes silane.

9. The rubber composition for tires according to claim 1, wherein the discoloration resistance is between 103 and 109.

10. At least one of a sidewall, clinch, or wing formed from the rubber composition for tires according to claim 1.

11. At least one of a sidewall, clinch, or wing, formed from the rubber composition for tires according to claim 2.

12. At least one of a sidewall, clinch, or wing formed from the rubber composition for tires according to claim 5.

13. At least one of a sidewall, clinch, or wing formed from the rubber composition for tires according to claim 7.

14. A pneumatic tire, comprising a tire component formed from the rubber composition according to claim 1.

15. The pneumatic tire according to claim 14,
   wherein the tire component is at least one of a sidewall, clinch, or wing.

16. A pneumatic tire, comprising a tire component formed from the rubber composition according to claim 2.

17. A pneumatic tire, comprising a tire component formed from the rubber composition according to claim 5.

18. A pneumatic tire, comprising a tire component formed from the rubber composition according to claim 7.

19. A pneumatic tire, comprising a tire component formed from the rubber composition according to claim 10.

* * * * *